June 10, 1958    P. F. DANIELSON    2,838,270
HANDLE STRUCTURES FOR VALVES AND THE LIKE
Filed Sept. 8, 1952
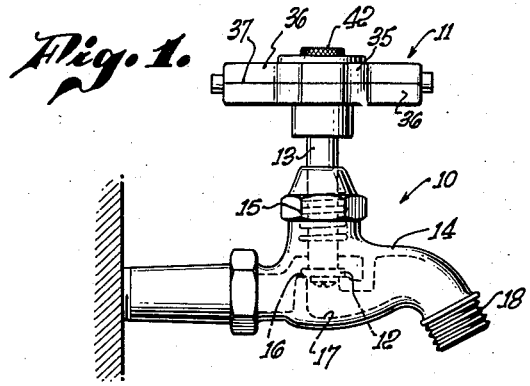
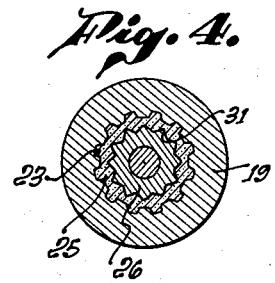
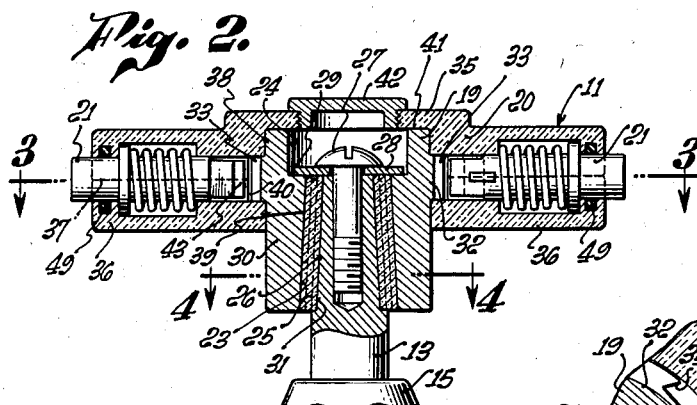
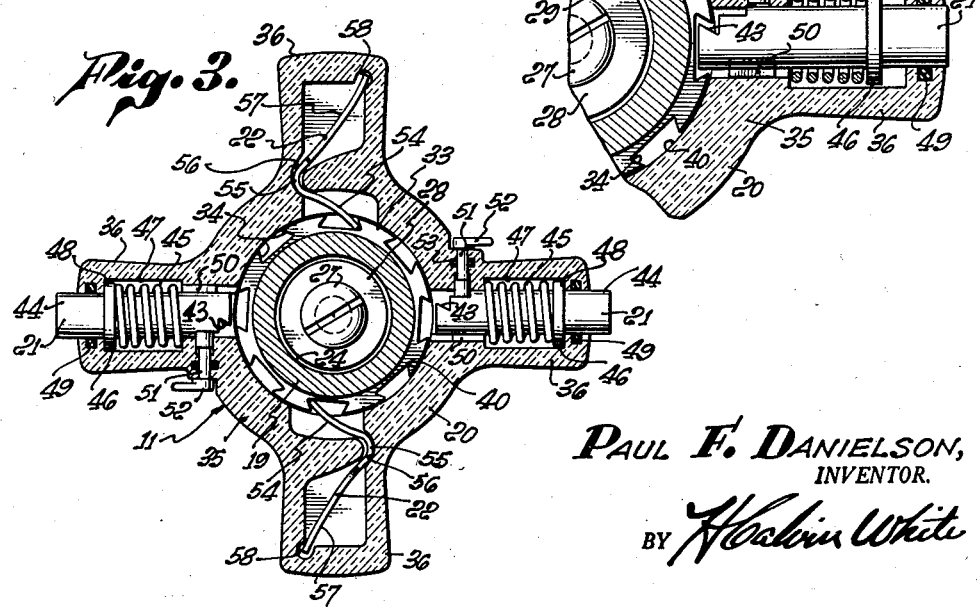
PAUL F. DANIELSON,
INVENTOR.
BY *Hadwin White*
ATTORNEY.

United States Patent Office 2,838,270
Patented June 10, 1958

2,838,270

HANDLE STRUCTURES FOR VALVES AND THE LIKE

Paul F. Danielson, San Marino, Calif., assignor to All-Power Manufacturing Co., Montebello, Calif., a corporation of California Application September 8, 1952, Serial No. 308,339

10 Claims. (Cl. 251—110)

This invention relates to improved handle structures for actuating manually controlled elements, and particularly adapted in certain respects for operating rotary valve elements.

The general object of the invention is to provide a novel handle structure which is specially designed to require an unusual type of manipulation for moving a valve or other controlled element a predetermined direction, to thus prevent operation of the element in that direction by a small child, while at the same time readily permitting its actuation by an adult. Particularly contemplated is a handle of this character which may be applied to a domestic water faucet or outdoor water valve, to prevent opening of the faucet or valve by small children.

Structurally, a device embodying the invention may include a rotary handle, a valve or other element to be turned by the handle, and a releasable clutch connection interconnecting these two parts. The clutch connection is manually actuable between a first or active condition, in which the handle is effective to turn the valve or other controlled element, and a second released condition in which the handle is rotatable relative to the controlled element. The clutch connection may include a detent or clutch member which is movably carried by either the handle element or the controlled element, and is releasably interengageable with a shoulder on the other of these parts to rotatably interlock the parts. Preferably, the clutch member comprises a detent pin which is carried by and movable relative to the handle.

The pin or other clutch element may normally be urged to its released condition by a spring or other yielding means, preferably having such strength as to require greater force than a small child can exert to actuate the clutch to its active condition. Also, in order to render the actuation of the handle even more difficult to a child, there may be provided a lock element which is operable until manually released, to positively retain the detent or clutch element against movement to its active position. Thus, a combination of several different motions are necessary to effect opening of the valve, with the result that such opening of the valve is virtually impossible to a small child.

While the device is purposely constructed to render difficult the actuation of the controlled element in one rotary direction (the opening direction when the element is a valve), I desirably so construct the handle as to very readily turn the element in a reverse or valve closing direction. For this purpose, the handle structure may include ratchet means acting at all times, regardless of the condition of the clutch connection, to transmit handle rotation in the second direction to the controlled element.

These ratchet means may comprise a leaf spring rotatable with the handle and acting to engage ratchet teeth on the controlled element.

Certain particular features of the invention have to do with the special formation of the handle structure as a replacement unit adapted to be applied to the stem of a conventional faucet. For this purpose, the unit may include an element containing a recess at one axial side into which the stem of a valve or the like is removably connectable. To adapt the device for attachment to stems of varying cross-sectional configurations, the unit preferably includes a deformable element, typically formed of a resinous plastic material, which may be received about the stem and tightened against it into conformance with the stem. This deformable element may be formed as a liner for the recess into which the stem is connected.

The above and other features and objects of the present invention will be better understood from the following detailed description of the typical embodiment illustrated in the accompanying drawing, in which:

Fig. 1 is a side view of a water valve embodying the invention, typically illustrated as the type of valve conventionally provided at the outside of a house for connection to a garden hose or the like;

Fig. 2 is an enlarged fragmentary vertical section through the handle structure of the Fig. 1 valve;

Fig. 3 is a transverse or horizontal section through the valve handle structure, and taken on line 3—3 of Fig. 2;

Fig. 4 is a transverse section taken on line 4—4 of Fig. 2;

Fig. 5 is a side view of the leaf spring type ratchet element of the valve handle; and Fig. 6 is an enlarged fragmentary transverse section through the handle structure and taken on the same plane as Fig. 3, but showing one of the detent or clutch elements of the handle in its active position.

Referring first to Fig. 1, I have typically shown at 10 a conventional outdoor water valve, to which has been applied a handle assembly 11 constructed in accordance with the invention. The valve 10 comprises the usual fluid flow control valve element 12 carried by a rotary stem 13 which threadedly engages the body 14 of the valve at 15. Movement of valve element 12 toward and away from its seat 16 controls the fluid flow through passage 17 in the valve body and to spout 18 to which a garden hose is connectable.

As best seen in Figs. 2, 3 and 6, the valve handle assembly includes an inner element 19 which is fastened to and rotatable with the stem 13, and an outer handle 20 which is rotatable both with and relative to element 19. The transmission of counterclockwise or valve opening rotation from handle 20 to element 19 and the valve stem is controlled by a pair of detent or clutch elements 21. Clockwise or valve closing rotation of handle 20 is transmitted to element 19 and stem 13 by a pair of leaf springs 22, which function as ratchet elements.

The stem carried element 19 contains an axially or vertically extending inner recess, having a lower upwardly tapering essentially frusto-conical portion 23, and an upper cylindrical portion 24. Into the lower portion 23 of this recess is inserted a tubular liner 25, which receives the upper end 26 of valve stem 13. Element 19 and its liner 25 are fastened tightly in fixed relation to stem 13 by a screw 27, which is connected into the upper end of the stem, and whose upper head bears against a washer 28 engaging annular upwardly facing transverse shoulder 29 of element 19.

The outer surface 39 of liner 25 tapers upwardly in correspondence with the engaged inner surface 23 of element 19, and preferably these two surfaces are of corresponding noncircular cross-sectional configuration, to positively prevent relative rotation between element 19 and the liner. For this purpose, surfaces 23 and 30 may have a number of axially extending splines, as brought out best in Fig. 4.

If it is known what type of valve the handle assembly 11 is to be attached to, the inner recess in liner 25 may be shaped in correspondence with the end 26 of the particular valve stem to which it is to be attached. However, in view of the large number of different shapes given to valve stems of different makes, it will ordinarily not be possible, where handle assembly 11 is sold as an accessory to be applied to a valve, to shape the liner 25 in exact accordance with the stem to which it will ultimately be attached. Consequently, I usually prefer to form liner 25 of a material characterized by greater deformability than either element 19 or stem 26, and desirably also of an elastic nature, so that upon tightening of screw 27, the liner is fastened tightly about end 26 of the stem, in a manner conforming to the particular noncircular configuration of the stem, and thus preventing relative motion between the two parts. For this purpose, liner 25 may be formed of a suitable readily deformable resinous plastic material, such as polyethylene. In order to assure most effective fastening of liner 25 to any of various types of stems, I find it desirable to give the inner surface 31 of the liner an upwardly tapering, essentially frusto-conical, and axially splined shape, as shown in the drawing.

Externally, element 19 is cylindrical and of a constant diameter except at a location near its upper end, at which the element has an enlarged diameter essentially annular toothed portion 32. This portion 32 of element 19 has a number of regularly circularly spaced radially projecting teeth 33, whose opposite sides 34 are angularly undercut in the dovetail fashion shown in Figs. 3 and 6. As will be brought out at a later point, teeth 33 of element 19 are engaged by clutch elements 21 and ratchet elements 22 to control the transmission of rotary motion between handle 20 and element 19.

Handle 20 is of essentially conventional external shape, having an inner hub portion 35 carrying four evenly circularly spaced radial projections 36. The handle may be formed of a suitable rigid and strong resinous plastic material, such as nylon, which may be transparent to permit viewing of the internal parts of the device. Preferably, the stem carried element 19 is also formed of such a plastic material. Where handle 20 is made of a plastic, it may be formed of two molded halves, cemented together along a line 37.

Handle 20 contains an inner recess which is shaped in correspondence with the outer surface of the upper portion of stem carried element 19, except as to the provision of teeth on element 19, so that element 19 fits into the handle in a manner retaining them in fixed axial relation while guiding the handle for relative rotation. As will be understood, the various engaging surfaces of element 19 and the handle act as bearing surfaces maintaining the two parts in the desired relation. For instance, these two parts have engaging cylindrical surfaces at 38 and 39, above and beneath the tooth portion 32 of the stem carried element, to guide the handle for rotation about the axis of the valve stem relative to element 19. This bearing effect is supplemented by the provision of partial cylindrical outer bearing surfaces on teeth 33 engaging a cylindrical inner surface of the handle at 40. The handle is fixed axially relative to element 19 by the provision of transverse bearing surfaces on the two parts at the upper and lower sides of toothed portion 32 of element 19, and at the upper end 41 of that element. At a location above the head of screw 27, handle 20 may contain an opening providing access to the screw, and into which may be removably threadedly attached a plug 42.

The device includes two individually operable clutch or detent elements 21 which are movably mounted in two opposed projections 36 of the handle. Each of these clutch elements comprises an essentially cylindrical pin extending radially through the corresponding handle projection, and movable radially in the projection between the retracted position of Fig. 3 and the active position of Fig. 6. At its inner end, each detent pin is cut away at one side to form an angular face 43 corresponding in angularity to and engageable with the undercut side surfaces at one side of teeth 33, so that in the active Fig. 6 position of the pin, the pin acts to transmit valve opening or counterclockwise rotation of handle 20 to element 19. Preferably, the innermost portion of the pin, which is movable into the space between teeth 33 in the active position of the pin, has a maximum dimension circularly about the axis of the device only slightly smaller than the minimum circular dimension of the space between teeth of element 19. Thus, the pin cannot be moved into its active position without first being positioned directly opposite an intertooth recess of element 19, with the result that it becomes rather difficult for a child to operate the device.

The outer end 44 of each of the clutch pins 21 projects outwardly beyond the handle projection within which it is received, to be depressible inwardly into active position by the finger of an operator. The pin is urged radially outwardly to its retracted Fig. 3 position by a coil spring 45 bearing against a flange 46 on the pin, the spring and flange being received within an enlarged diameter portion 47 of the pin receiving recess in the handle. Flange 46 is engageable with a transverse shoulder 48 formed in the handle to limit radially outward movement of the pin at the Fig. 1 retracted position. Radially inwardly and radially outwardly of the spring and flange, the handle has portions of a diameter corresponding to the pin and guiding it for the desired radial sliding movement. A seal ring 49 may be provided about the pin outwardly beyond flange 48, to prevent the access of moisture to spring 45 and the major extent of the pin. Near its inner end, pin 21 may be provided with a spline or key portion 50 received within a spline recess in the handle to retain the pin against rotation about its longitudinal axis.

I desirably provide in conjunction with each of the clutch pins 21 a lock element 51, which is adapted to releasably retain the pin in its Fig. 3 retracted position. This lock element may comprise a second pin which is movable transversely of the clutch pin between the Fig. 3 locking position and the Fig. 6 released position. In the Fig. 3 position of the locking element, the inner head of this element moves into a side recess formed in the clutch pin, to be engageable by a transverse shoulder on the clutch pin and limit its radially inward movement. A small handle 52 is provided at the outer end of locking element 51, for actuating it between its active and released positions. A seal ring 53 may be positioned about the locking element, to supplement the effect of seal ring 49 in preventing access of moisture to the working mechanism. This ring may be so constructed as to offer a small amount of frictional resistance to axial displacement of locking element 51, to thus retain the locking element against accidental actuation in either direction by mere turning of the handle. For this purpose, ring 49 may tend to resiliently return to an internal diameter smaller than the external diameter of the locking element.

The two handle projections 36 between those containing clutch pins 21 are recessed to contain the leaf spring ratchet element 22, which control actuation of the valve in a closing direction (see Fig. 3). Each of the leaf spring ratchet elements has an inner angularly extending portion 54, which is engageable with teeth 33 of stem carried element 19 at sides of the teeth opposite those acted against by clutch pins 21. Thus, the leaf springs transmit rotary motion in a valve closing or counterclockwise direction from handle 20 to the stem carried element 19, while at the same time being yieldingly deflectible outwardly upon reverse or valve opening rotation, to permit rotation of the handle in the valve opening direction independently of element 19.

Each leaf spring ratchet element 22 has a curved portion 55 which is positioned but free for limited movement within a restricted curved portion 56 of the spring receiving recess in the handle. Outwardly beyond its curved portion 55, the spring has a portion 57 extending diagonally across an enlarged portion of the handle recess, and terminating within a notch 58, which retains the outer end of the spring against substantial movement. As will be understood, the portion 57 of the spring provides most of the yielding force for urging its inner portion 54 into a ratchet type of engagement with the toothed portion of element 19. So that outer portion 57 of the spring may be more resilient than the inner tooth-engaging portion 54, portion 57 is desirably of a reduced axial dimension, as brought out in Fig. 5.

In applying the illustrated handle unit to a conventional valve, it is necessary merely to remove the original handle of the valve, and then place element 19 and its removable liner 25 about the end of the valve stem, after which screw 27 may be tightened into the end of the valve stem, and plug 42 screwed into the upper handle opening. The handle 20 will then be effective at all times to rotate stem 13 in a valve closing direction, while permitting free rotation of the handle relative to the stem in a valve opening direction. In order to render the handle effective also to open the valve, one of the clutch pins 21 must be moved and held inwardly to engage and act against one of the teeth 33 of element 19. Spring 45 may be of such strength as to render it difficult for a small child to move the clutch pin to its active position. Also, the locking elements 51 may be actuated to their locking positions, to require that one of these elements be released before one of the clutch pins may be actuated to a valve opening position.

I claim:

1. A handle unit for actuating a valve having a rotary actuating stem movable in predetermined opening and closing rotary directions, said unit comprising a first member containing a recess for receiving an end of said stem, means for securing said member on said stem and against withdrawal therefrom, a handle mounted to said first member for rotation therewith and relative thereto about the stem axis, a ratchet connection between said handle and said first member acting to transmit rotary motion from the handle to said first member in said closing direction but not in said opening direction, a manually actuable clutch element movable relative to said handle and said member between a released position and an active position in which said element transmits rotary motion in said opening direction from the handle to said first member and stem, said handle being rotatable independently of said first member in said opening direction when said clutch element is in released position, and a spring yieldingly urging said clutch element to said released position and resisting its actuation to said active position to thereby prevent opening movement of the valve stem by small children.

2. A handle unit as recited in claim 1, in which said ratchet connection comprises means on said first member forming a series of ratchet shoulders, and a leaf spring contained within a recess in the handle and engaging said shoulders in a ratchet connection.

3. A handle unit as recited in claim 1, including a lock element movably carried by the handle and operable to releasably prevent actuation of said clutch element from released to active position.

4. A handle unit as recited in claim 1, in which said handle has a hub portion disposed about said first member, and said handle has a pair of circularly offset projections extending essentially radially outwardly from said hub portion, said clutch element extending and moving radially within a first of said projections and projecting therefrom for manual actuation, and said ratchet connection having a portion received within the second projection.

5. A handle unit as recited in claim 1, in which said first member has a series of teeth formed thereon, said clutch element being movable radially into and out of interengagement with said teeth, said teeth having ratchet shoulders at one side, and said ratchet connection comprising a ratchet element movable relative to said handle and engageable with said ratchet shoulders on the teeth.

6. A handle unit as recited in claim 5, in which said handle has two circularly spaced essentially radial projections, said clutch element comprising a pin extending and moving essentially radially in a first of said projections and projecting from an outer end thereof for manual actuation, said ratchet connection comprising a leaf spring contained within a recess in the second of said handle projections and engaging said teeth, said device including a lock element movably carried by the handle and operable to releasably lock the clutch element against radially inward movement toward said active position of engagement with said teeth.

7. A handle unit as recited in claim 1, in which said recess in said first member extends entirely axially therethrough, and said means for attaching said member to the stem is a screw insertible axially into the stem through said recess and holding the member against axial removal from the stem.

8. A valve structure comprising a valve element having an actuating stem rotatable in opening and closing directions, a first member containing a recess receiving an end of said stem, means securing said member on said stem and against withdrawal therefrom, a handle mounted to said first member for rotation therewith and relative thereto about the stem axis, a ratchet connection between said handle and said first member acting to transmit rotary motion from the handle to said first member in valve closing direction but not in valve opening direction, a manually actuable clutch element movable relative to said handle and said member between a released position and an active position in which said element transmits rotary motion in valve opening direction from the handle to said first member and stem, said handle being rotatable independently of said first member in said valve opening direction when said clutch element is in released position, and a spring yieldingly urging said clutch element to said released position and resisting its actuation to said active position to thereby prevent opening of the valve by small children.

9. A handle unit as recited in claim 8, including a lock element movably carried by the handle and operable to releasably prevent actuation of said clutch element from released to active position.

10. A handle unit as recited in claim 8, in which said handle has a hub portion disposed about said first member, and said handle has a pair of circularly offset projections extending essentially radially outwardly from said hub portion, said clutch element extending and moving radially within a first of said projections and projecting therefrom for manual actuation, and said ratchet connection having a portion received within the second projection.

References Cited in the file of this patent

UNITED STATES PATENTS

| Re. 18,244 | Stevens | Nov. 3, 1931 |
| 164,100 | Plymale | June 8, 1875 |

(Other references on following page)

UNITED STATES PATENTS

| | | | |
|---|---|---|---|
| 573,732 | Warn | Dec. 22, | 1896 |
| 710,129 | Watrous | Sept. 30, | 1902 |
| 993,714 | Popp | May 30, | 1911 |
| 1,040,327 | Hollis | Oct. 8, | 1912 |
| 1,081,968 | Kitts | Dec. 23, | 1913 |
| 1,162,935 | Lange | Dec. 7, | 1915 |
| 1,179,377 | Stenger | Apr. 11, | 1916 |
| 1,352,631 | Ripsch et al. | Sept. 14, | 1920 |
| 1,367,500 | Redmon | Feb. 1, | 1921 |
| 1,473,481 | Kleist | Nov. 6, | 1923 |
| 1,562,121 | Newton | Nov. 17, | 1925 |
| 1,638,325 | Davis | Aug. 9, | 1927 |
| 1,897,854 | Myers | Feb. 14, | 1933 |
| 2,032,335 | Simpson | Feb. 25, | 1936 |
| 2,061,811 | Sinko | Nov. 24, | 1936 |
| 2,096,438 | Rockwell | Oct. 19, | 1937 |
| 2,406,220 | Hines | Aug. 20, | 1946 |
| 2,521,419 | Sellers | Sept. 5, | 1950 |
| 2,223,139 | Whiteley | Nov. 8, | 1955 |

FOREIGN PATENTS

| | | |
|---|---|---|
| 7,570 | Great Britain | of 1886 |